United States Patent Office 3,347,826
Patented Oct. 17, 1967

3,347,826
POLYMERIC COMPOSITION DERIVED
FROM OXABICYCLONONANES
August Henry Frazer, Wilmington, Del., assignor to E. I.
du Pont de Nemours and Company, Wilmington, Del.,
a corporation of Delaware
No Drawing. Filed Sept. 16, 1964, Ser. No. 397,010
7 Claims. (Cl. 260—47)

ABSTRACT OF THE DISCLOSURE

The low temperature reaction of cis,cis-1,5-cyclo-octadiene with a peroxy acid in the presence of water or a mineral acid produces a 2-acyloxy-6-hydroxy-9-oxabi-cyclo (3.3.1)-nonane (I) which is readily hydrolyzed to 2,6-dihydroxy-9-oxabicyclo (3.3.1) nonane (II). (II), its bischloroformate, or its dialkyl or diaryl discarbonate form polycarbonate, polyesters, polyurethanes, and polyestercarbonates when reacted with other bisphenols, diesters, diamines, or diisocyanates. Flims and filaments of these polymers are particularly resistane to oxidative degradation.

This invention relates to novel organic chemical compounds and more particularly to certain novel oxabicyclo-nonane compounds and to polymeric compositions derived therefrom.

Various limitations in the chemical and physical properties of commercially available polycarbonates and polyurethanes, as well as fabrication difficulties, have tended to limit their usefulness in the plastics art and, in particular, in the textile art. For example, the polyurethane produced from hexamethylene diisocyanate and tetramethylene-1,4-diol has been found to have a melting point of about 180° C., which is too low a temperature for use in apparel which requires ironing. Similarly, polycarbonates synthesized chiefly from 2,2-bis(4-hydroxyphenyl)propane are limited in their usefulness in many film and fiber applications due to their sensitivity to oxidative attack, degradation by alkali and solubility in commercial dry cleaning solvents. Similar difficulties have been found to exist in polyesters and polyestercarbonates.

The novel oxabicyclononanediol of this invention can be esterified with organic diacids to provide materials which are useful as film-forming polyesters. The diol can also be converted to the corresponding bischloroformate which readily reacts with other difunctional organic chemical compounds such as diamines and diols to provide high molecular weight polymeric compositions from which useful films and fibers can be prepared. Other polymeric compositions of similar utility can be prepared from the dialkyl and diaryl carbonates of the oxabi-cyclononanediol.

Accordingly, an object of this invention is to provide novel oxabicyclononanes and a process for their preparation. Another object is to provide thermally stable and oxidation-resistant polycarbonates, polyurethanes, polyestercarbonates and polyesters derived from the novel oxabicyclononanes. A further object is to provide fibers and films of polycarbonates, polyurethanes, polyestercarbonates and polyesters derived from the novel oxabi-cyclononanes. Other objects will appear hereinafter.

In accordance with these objects, there are provided novel organic chemical intermediates characterized by the following structural formula:

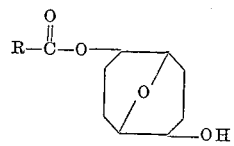

wherein R is a member selected from the group consisting of methyl, ethyl, phenyl, 3-carboxy-2,3,3-trimethyl-cyclopentyl, ortho-carboxyphenyl, 2-carboxyvinyl, meta-chlorophenyl, and trifluoromethyl radicals; in addition, R may represent a hydrogen atom.

The novel oxabicyclononane monomers of this invention, which are derived from the aforementioned derivatives, are characterized by the following structural formula:

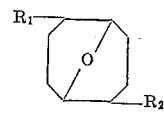

wherein $R_1$ and $R_2$ are identical and are members selected from the group consisting of hydroxy, acetoxy, carboxymethoxy, carboxyethoxy, carboxyphenoxy, and chloroformyl radicals.

The novel polymeric compositions of this invention are characterized by the following structural formulae:

(1) Polycarbonates consisting essentially of the recurring structural unit

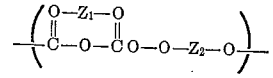

wherein $Z_1$ represents the divalent radical

and $Z_2$ is a divalent organic radical selected from the group consisting of $Z_1$, p-phenylene, m-phenylene, iso-propylidene di-p-phenylene, and sulfonyl di-p-phenylene; (2) polyurethanes consisting essentially of the recurring structural unit

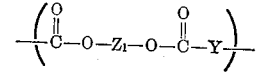

wherein $Z_1$ has the significance set forth hereinbefore and Y is a divalent organic radical selected from the group consisting of 1,4-piperazinylene, methylenebis(1,4-cyclohexyleneimino) and methylenebis(1,4-phenylene-imino); (3) polyestercarbonates consisting essentially of the recurring structural unit

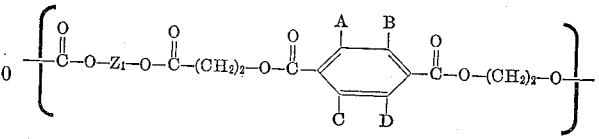

wherein $Z_1$ has the significance set forth hereinbefore and A, B, C, and D are members selected from the group consisting of hydrogen and lower alkyl radicals and (4)

polyesters consisting essentially of a recurring structural unit selected from the class of (a)
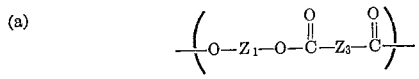

and (b)
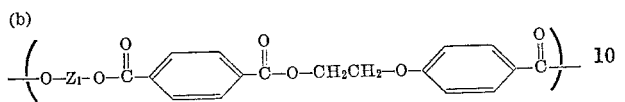

wherein $Z_1$ has the significance set forth hereinbefore and $Z_3$ is a divalent organic radical selected from the group consisting of p-phenylene, m-phenylene, and mixtures of p-phenylene and m-phenylene with up to about 90% p-phenylene content.

The novel oxabicyclononanes of this invention are prepared by forming a reaction mixture by slowly adding cis, cis-1,5,cyclooctadiene to a molar excess of a peroxy acid at a temperature in the range of from about −10° C. to about +5° C. and in the presence of water or a mineral acid, maintaining the reaction mixture within said temperature range for at least three hours, allowing the reaction to proceed for at least three additional hours and thereafter recovering the product. Hydrolyzing the latter product will yield the novel oxabicyclononanediol. This reaction sequence is represented as follows:

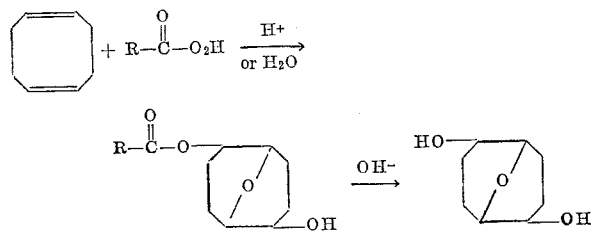

wherein RCO— constitutes an acyl group.

While the exact course of the process of this invention which produces the 2-acyloxy-6-hydroxy-9-oxabicyclo-(3.3.1)-nonanes is not understood with complete certainty, the process is theorized to effectively involve the addition of two moles of the peroxy acid to one mole of cis,cis-1,5-cyclooctadiene to yield the appropriate dihydroxy-diacyloxy intermediate from which one mole of the corresponding organic carboxylic acid is subsequently removed, with a transannular action occurring to form the oxabicyclo structure. Referring again to the process, about one mole of cis,cis-1,5-cyclooctadiene is slowly added to about 2 moles of the peroxy acid. The latter reagent is preferably present in slight excess as a dilute solution in an inert organic solvent, which commonly is the corresponding organic carboxylic acid. The highest yields of products are obtained when the reagents are added in the order indicated. While the reactants are being mixed and for several hours thereafter, the temperature of the reaction mixture is not allowed to rise above +5° C. nor fall below −10° C. and is preferably maintained, by external cooling, within the range of −5° C. to 0° C. At temperature below about −10° C., the reaction is seriously inhibited whereas, as the temperature rises above about +5° C., the reaction tends to be uncontrollable. After the reaction mixture has stood for about six hours or more, the solvent is removed under reduced pressure while maintaining the pot temperature below 40° C. The residue is neutralized with dilute caustic solution, the resulting solution cooled to about 0° C., and the supernatant liquid layer separated from the solid residue. This solid residue is dissolved in an inert solvent (e.g., ethyl actate) with which any remaining water can be removed by azeotropic distillation. After filtering the anhydrous solution, the remaining solvent is removed under reduced pressure. The 2-acyloxy-6-hydroxy-9-oxabicyclo(3.3.1)nonane product is isolated by fractional distillation, or by fractional crystallization when preferable, from the residue. Refluxing the 2-acyloxy - 6-hydroxy-9-oxabicyclo(3.3.1)nonane product with a dilute basic solution for several hours under nitrogen, followed by removal of the water under reduced pressure and crystallization of the residue from a cooled solution of a suitable solvent (e.g. ethyl acetate), yields the desired diol. The diol can be further purified by subsequent recrystallization. The diol can be converted to the corresponding bischloroformate and to the dialkyl and the diaryl dicarbonates by procedures well known in the art.

Among the peroxy acids which can be utilized in the process of this invention are peroxyformic, peroxyacetic, peroxypropionic, peroxybenzoic, peroxycamphoric, monoperoxyphthalic, monoperoxymaleic, m-chloroperoxybenzoic, trifluoroperoxyacetic, and the like. Commercial peracetic acid solution (40% peracetic acid in acetic acid and containing approximately 0.5% sulfuric acid) is the preferred peracid reagent. Mineral acids which may be employed include sulfuric, hydrobromic, hydrochloric, phosphoric acid, and the like.

Generally, the polycarbonates of this invention may be prepared from nearly equimolar amounts of 2,6-bis(chloroformyl) - 9 - oxabicyclo(3.3.1)nonane and the appropriate bisphenol by the usual interfacial polymerization techniques. Polymers of especially high molecular weight are obtained when the reaction is carried out in the presence of a quaternary ammonium compound such as, for example, tetraethylammonium chloride. In accordance with the usual interfacial polymerization procedure, the reactants are present in different liquid phases which are immiscible and which, in the preparation of the present polymers, constitute two solvent media. Thus the bisphenol is dissolved in one solvent medium, the diacyl halide is dissolved in a second solvent medium immiscible with the first, and the solutions are rapidly combined with vigorous agitation. Normally, an alkaline aqueous medium serves as the solvent for the bisphenol, and an organic solvent is utilized for the diacyl halide, said organic solvent being so chosen that it exerts a solvating effect on the polymer produced, either dissolving it completely or serving as a swelling medium. These polycarbonates may also be prepared by a modification of the above procedure, said modification consisting in the use of two solvents which are initially miscible with each other, for example, p-dioxane and water or tetrahydrofuran and water, but which become immiscible as the polymerization reaction proceeds. The polycarbonates of this invention may also be prepared by powder polymerization techniques similar to that described in "Preparative Methods of Polymer Chemistry," T. W. Campbell and W. R. Sorenson, Interscience Publishers, Inc., New York (1961), page 64. By this technique, a prepolymer is initially formed from, for example, an appropriate bisphenol and a dialkyl or diaryl carbonate of 2,6-dihydroxy-9-oxabicyclo(3.3.1)nonane, utilizing, for example, triphenylphosphine as a catalyst. The prepolymer is ground to a powder and is polymerized to a high molecular weight product by heating under high vacuum, preferably using a nitrogen bleed to remove volatile by-products. The singularly preferred polycarbonate of this invention is prepared from about equimolar amounts of 2,6-bis(chloroformyl)-9-oxabicyclo(3.3.1)nonane and 2,2-bis(4-hydroxyphenyl)propane, preferably by interfacial polymerization. Additional bisphenols useful for preparing the polycarbonates of this invention include hydroquinone, resorcinol, and bis(4-hydroxyphenyl)-sulfone.

The polyurethanes of this invention may generally be prepared by interfacial polymerization methods similar to those described above, with an appropriate diamine being used in place of the bisphenol. High temperature solution polymerization involving an addition reaction between 2,6-dihydroxy-9-oxabicyclo(3.3.1)nonane and a suitable diisocyanate, such as bis(4-isocyanatophenyl)methane, may also be employed. In this type of reaction, a high boiling inert solvent or a mixture of such solvents, is employed to dissolve both reactants. The polymer is precipitated by cooling the reaction mixture or by pouring the reaction mixture into an insolubilizing medium, such as water. The singularly preferred polyurethane of this invention is prepared from about equimolar amounts of 2,6-bis(chloroformyl)-9-oxabicyclo(3.3.1)nonane and bis(4-aminocyclohexyl)methane (70% t,t-isomer), preferably by interfacial polymerization. Additional diamines useful for preparing the polyurethanes of this invention include piperazine and bis(4-aminocyclohexyl)methane (53% t,t-isomer).

The polyestercarbonates of this invention are preferably prepared by a powder polymerization procedure from a dialkyl or diaryl dicarbonate of 2,6-dihydroxy-9-oxabicyclo-(3.3.1)nonane and a suitable diol, such as bis(beta-hydroxyethyl)-terephthalate or bis(beta-hydroxyethyl)durene dicarboxylate.

2,6-dihydroxy-9-oxabicyclo(3.3.1)nonane or its corresponding diacyloxy derivatives may be melt polymerized with, respectively, a diester derived from an aromatic dicarboxylic acid or the aromatic acid itself to form polyesters which can be melt pressed into films. Suitable diesters include dimethylterephthalate, diphenylterephthalate, dimethylisophthalate, mixtures of dimethylisophthalate and diethylterephthalate, and bis(beta-hydroxyethyl)-terephthalate.

The polymers of this invention may be cast into films or dry spun in filamentary form from solutions containing about 5% to about 40% by weight of the polymer dissolved in a solvent selected from a class consisting of sulfoxides such as dimethyl sulfoxide, alkylamides such as N-methyl-pyrrolidone, halogenated aromatic hydrocarbons such as o-dichlorobenzene, organic acids such as formic acid, and mixtures of halogenated hydrocarbons with strong organic acids such as 1,1,2-trichlorethane/formic acid (e.g., 65/35 by volume). Films and filaments may also be prepared by melt pressing and melt spinning techniques well known in the art.

For a clearer understanding of the invention, the following specific examples are given. These examples are intended to be merely illustrative of the invention and not in limitation thereof. Unless otherwise indicated, parts and percentages are expressed on a weight basis and inherent viscosity ($\eta_{inh}$) has been determined in accordance with the following equation:

$$\eta_{inh} = \frac{ln\ \eta_{rel}}{C}$$

The relative viscosity ($\eta_{rel}$) may be determined by dividing the flow time in a capillary viscometer of a dilute solution of the polymer by the flow time for the pure solvent. The concentration (C) used in the examples is 0.5 gram of polymer per 100 ml. of solution and the measurements are made at 30° C. Unless otherwise specified, inherent viscosities are measured in a mixed solvent comprising 40 parts by weight 1,1,2,2-tetrachloroethane and 60 parts by weight phenol. Tenacity elongation, and initial modulus are coded as T/E/Mi and are reported in conventional units.

*Example I*

This example illustrates the preparation of 2-acetoxy-6-hydroxy-9-oxabicyclo(3.3.1)nonane. To 2,300 g. of 40% commercial peracetic acid (11.04 moles) is slowly added 549 g. (5.08 moles) of cis,cis-1,5-cyclooctadiene. During the addition and for 3 hours thereafter, the reaction mixture is maintained within a temperature range of −5° C. to 0° C. After the reaction mixture has stood overnight, the excess acetic acid is removed under reduced pressure at a pot temperature of less than 40° C. The residue, weighing 2,198 g., is then neutralized with 785 ml. of a 20% sodium hydroxide solution. The neutralized solution is chilled to 0° C. and the supernatant liquid is decanted from the semi-solid on the bottom of the reaction flask. The residual solid is dissolved in ethyl acetate, and the remaining water is removed as an azeotrope with ethyl acetate. The ethyl acetate solution is filtered and the solvent removed under reduced pressure. The residue is distilled to give 954 g. of 2-acetoxy-6-hydroxy-9-oxabicyclo(3.3.1)nonane which boils within the range of 130–135° C./8 mm. The latter material has an experimentally-determined molecular weight of 201, calculated on the basis of a hydroxyl group determination (i.e., on the basis of two hydroxyl groups/molecule). The theoretical molecular weight is 200 g./mole. The infrared spectrum of this material is consistent with that expected for the cited structure.

When the procedure set forth hereinbefore is repeated with monoperoxymaleic acid being used instead of peracetic acid, a solid residue is recovered which has a melting point of 110° C. to 122° C. The wide range in the melting point is theorized to result from an isomeric mixture of the residue. The neutralization equivalent indicates that the solid residue has one carboxyl group present, this being consistent with the structure expected for the mono(6-hydroxy-9-oxabicyclo(3.3.1)nonan-2-yl) ester of maleic or fumaric acid.

When the procedure set forth hereinbefore is again repeated with perbenzoic acid being used instead of peracetic acid, a solid residue is recovered which has a melting point of 45° C. to 55° C. The wide range in the melting point is theorized to result from benzoic acid contamination of the product, 2-benzoyloxy-6-hydroxy-9-oxabicyclo(3.3.1)nonane. Infrared analysis indicates that the chemical structure of the product is free of the original reactants.

*Example II*

This example illustrates the preparation of 2,6-dihydroxy-9-oxabicyclo(3.3.1)nonane.

A solution of 954 g. (4.76 moles) of 2-acetoxy-6-hydroxy-9-oxabicyclo(3.3.1)nonane in 1,800 ml. of 20% sodium hydroxide solution is refluxed overnight under nitrogen. The water is removed under reduced pressure and the residue is dissolved in 5 liters of boiling ethyl acetate. The ethyl acetate solution is filtered and the filtrate is chilled in wet ice to produce 700 g. (93% yield) of a white crystalline precipitate, melting point 115° C. to 118° C. The 2,6-dihydroxy-9-oxabicyclo(3.3.1)nonane thus obtained is twice recrystallized from ethyl acetate to give a purified sample having a melting point of 128° C. to 129° C. The experimentally-determined molecular weight of this compound, based on a hydroxyl group determination, agrees with the theoretical value of 158. The infrared spectrum of this product is consistent with that expected for the cited structure.

*Example III*

This example illustrates the preparation of 2,6-diacetoxy-9-oxabicyclo(3.3.1)nonane.

A solution of 31 g. (0.2 mole) of 2,6-dihydroxy-9-oxabicyclo(3.3.1)nonane in 50 g. of acetic anhydride is refluxed overnight under nitrogen. The excess acetic anhydride and acetic acid are removed under reduced pressure and the residue crystallized from 2 liters of hot water. After the recrystallized product is dried, 40 g. (0.17 mole) of white crystalline 2,6-diacetoxy-9-oxabicyclo(3.3.1)nonane is obtained, melting point 99° C. to 100° C. An ebulliometric determination of the molecular weight of this material, run in benzene, gives a value of 241, the theoretical value being 242 g./mole. The infrared spectrum of this material is consistent with that expected for the cited structure.

*Example IV*

This example illustrates the preparation of 2,6-bis-(chloroformyl)-9-oxabicyclo(3.3.1)nonane.

To a solution of 350 g. (3.5 moles) of phosgene in 2.5 liters of tetrahydrofuran is slowly added a solution comprising 100 g. (0.63 mole) of 2-acetoxy-6-hydroxy-9- oxabicyclo(3.3.1)nonane, 132 g. (1.1 moles) of dimethylaniline, and 500 ml. of tetrahydrofuran. During the addition and for 3 hours thereafter, the reaction mixture is maintained within a temperature range of 0° C. to 5° C. From the onset of the addition, there is an immediate precipitation of a white solid which continues for the next 3 hours. After it has stood overnight, the reaction mixture is filtered and the excess phosgene and tetrahydrofuran removed under reduced pressure. The residue is crystallized from 2 liters of petroleum ether to give, after drying, 140 g. of an off-white crystalline material. After two recrystallizations from petroleum ether, the 2,6-bis-(chloroformyl) - 9-oxabicyclo(3.3.1)nonane product exhibits a melting point of 101° C. to 102° C. The infrared spectrum for this crystalline solid is consistent with that expected for the cited structure.

*Example V*

This example illustrates the preparation of 2,6-bis-(carboxyphenoxy)-9-oxabicyclo(3.3.1)nonane.

To a Waring Blendor containing a solution of 300 ml. of distilled water, 2.2 g. (0.55 mole) of sodium hydroxide, 5.2 g. (0.55 mole) of phenol, and 1.2 g. of tetraethylammonium chloride is added, with vigorous agitation, a solution of 7.06 g. (0.24 mole) of 2,6-bis(chloroformyl)-9 - oxabicyclo-(3.3.1)nonane in 150 ml. of methylene chloride. The reaction mixture is rapidly stirred for 5 minutes then poured into 2 liters of water. The methylene chloride is removed with a stream of nitrogen and the residue is recrystallized from ethyl alcohol. After being dried, 8.7 g. of crude material is obtained. After two recrystallizations of the crude product from ethyl alcohol, a white crystalline precipitate of 2,6-bis(carboxyphenoxy)-9-oxabicyclo(3.3.1)nonane, melting point 130° C. to 131° C., is isolated. The infrared spectrum for this material is consistent with that expected for the cited structure.

*Example VI*

This example illustrates the preparation of 2,6-bis-(carboxymethoxy) - 9-oxabicyclo(3.3.1)nonane and of 2,6-bis-(carboxyethoxy)-9-oxabicyclo(3.3.1)nonane.

(a) To a solution of 29.3 g. (0.1 mole) of 2,6-bis-(chloroformyl)-9-oxabicyclo(3.3.1)nonane and 300 ml. of benzene is slowly added 400 ml. of methyl alcohol. The resulting solution is refluxed overnight, after which the benzene and excess methyl alcohol are removed under reduced pressure. The residue is recrystallized from methyl alcohol and, after being dried, yields 18 g. of a white solid. After two additional crystallizations from methyl alcohol, the white crystalline 2,6 - bis(carboxymethoxy)-9-oxabicyclo(3.3.1)nonane exhibits a melting point of 81° C. to 82° C. The infrared spectrum for this material is consistent with that expected for the cited structure.

(b) By a procedure similar to that described above in (a), the reaction between 2,6-bis(chloroformyl)-9-oxabicyclo(3.3.1)nonane and ethyl alcohol yields 2,6-bis(carboxyethoxy) - 9-oxabicyclo(3.3.1)nonane, boiling range 144–146° C./0.8 mm., in 83% yield. The infrared spectrum for this material is consistent with that expected for the cited structure.

*Example VII*

This example illustrates the preparation of a polycarbonate from 2,2 - bis(4-hydroxyphenyl)propane and 2,6-bis-(chloroformyl)-9-oxabicyclo(3.3.1)nonane.

To a Waring Blendor containing 125 ml. of distilled water, 2.85 g. (0.0125 mole) of 2,2-bis(4-hydroxyphenyl)propane, 1.1 g. (0.0275 mole) of sodium hydroxide, and 1.2 g. (0.007 mole) of tetraethylammonium chloride is added, with rapid stirring, a solution to 3.53 g. (0.0125 mole) of 2,6 - bis - (chloroformyl)-9-oxabicyclo(3.3.1)-nonane in 75 ml. of ethylene dichloride. This reaction mixture is stirred for 5 minutes and is then poured into 1 liter of methanol to precipitate the polymer. The product is isolated, washed three times with water and three times with methanol, and is dried overnight in vacuo at 70° C. The yield of polymer is 5.3 g. The polymer melt temperature is 280° C., $\eta_{inh}$ is 1.06. A sample of the polycarbonate prepared by this procedure, having an inherent viscosity of 2.0, is dry spun from an 18% solution in methylene chloride to produce filaments which, after being drawn 2× at 150° C., exhibit T/E/Mi values of 2.1/25/30 when measured at 21° C. and 65% relative humidity.

Filaments can be prepared from this polycarbonate by conventional melt spinning techniques. A sample of this polycarbonate species, having an inherent viscosity of 0.75, is melt extruded at 228° C. to produce filaments which, after being drawn 3.5× at 240° C., exhibit T/E/Mi values of 4.1/20/40 when measured at 21° C. and 65% relative humidity.

*Example VIII*

This example illustrates the preparation of a polycarbonate from bis(4 - hydroxyphenyl)sulfone and 2,6-bis-(chloroformyl)-9-oxabicyclo(3.3.1)nonane, and filament preparation therefrom.

(a) To a Waring Blendor containing 3.53 g. (0.0125 mole) of 2,6 - bis(chloroformyl) - 9 - oxabicyclo(3.3.1) nonane in 125 ml. of tetrahydrofuran is added, with stirring, a solution of 3.12 g. (0.0125 mole) of bis(4-hydroxyphenyl)sulfone and 2.65 g. (0.0275 mole) of sodium carbonate in 75 ml. of water. The reaction mixture is stirred for 5 minutes and is worked up as described in the previous example to produce 5.1 g. of polymer having a polymer melt temperature of 290° C.; $\eta_{inh}$ is 0.97.

(b) A sample of the polycarbonate prepared by the method of (a), above, and having an inherent viscosity of 1.2, is dry spun into useful filaments by a procedure, similar to that of Example XII, from a spinning solution comprising 22% solids in a mixture of 1,1,2-trichloroethane/formic acid (65/35 by volume).

*Example IX*

This example illustrates the preparation of a polycarbonate from 2.6-bis(carboxyphenoxy)-9-oxabicyclo (3.3.1)nonane and 2,6-dihydroxy - 9 - oxabicyclo(3.3.1) nonane by a powder polymerization procedure.

To a small polymer tube is charged 4.38 g. (0.011 mole) of 2,6-bis(carboxyphenoxy)-9-oxabicyclo(3.3.1) nonane, 1.58 g. (0.01 mole) of 2,6-dihydroxy-9-oxabicyclo (3.3.1)nonane, and 0.005 g. of triphenylphosphine. This tube is placed in a refluxing (198° C.) bath of ethylene glycol and allowed to remain therein overnight. The tube is then removed, cooled, and the solid product removed and ground to a powder with a mortar and pestle. The pulverized product is returned to the polymer tube and the polymerization completed by heating for 18 hours at 220° C. at 1 mm. pressure. The polycarbonate product thus obtained displays a polymer melt temperature at 250° C., $\eta_{inh}$ is 0.60. Light stable, oxidation resistant films were melt pressed from this polycarbonate.

*Example X*

This example illustrates the preparation of a polycarbonate from hydroquinone and 2,6-bis(carboxyphenoxy)-9-oxabicyclo(3.3.1)nonane.

A small polymer tube containing 4.38 g. (0.011 mole) of 2,6-bis(carboxyphenoxy)-9-oxabicyclo(3.3.1)nonane, 1.10 g. (0.010 mole) of hydroquinone, and 0.005 g. of triphenylphosphine is treated as in Example IX to produce a polycarbonate having a polymer melt temperature of 310° C., $\eta_{inh}$=0.53. Light stable, oxidation resistant films were melt pressed from this polycarbonate.

*Example XI*

This example illustrates the preparation of a polycarbonate from resorcinol and 2,6-bis(carboxyphenoxy)-9-oxabicyclo(3.3.1)nonane.

A small polymer tube containing 4.38 g. (0.011 mole)

of 2,6-bis(carboxyphenoxy)-9-oxabicyclo(3.3.1)nonane, 1.1 g. of resorcinol, and 0.005 g. of triphenylphosphine is treated as in Example IX to produce a polycarbonate having a polymer melt temperature of 270° C.; $\eta_{inh}$=0.50. Light stable, oxidation resistant films were melt pressed from this polycarbonate.

*Example XII*

This example illustrates the preparation of a polyurethane from 2,6-bis(chloroformyl)-9-oxabicyclo(3.3.1) nonane and bis(4-aminocyclohexyl)methane (70% t,t-isomer).

To a Waring Blendor containing 125 ml. of water, 2.65 g. (0.0275 mole) of sodium carbonate, 2.63 g. (0.0125 mole) of bis(4-aminocyclohexyl)methane (liquid mixture containing 70% trans, trans-isomer) and 25 ml. of ethylene dichloride is added, with rapid stirring, a solution of 3.53 g. (0.0125 mole) of 2,6-bis(chloroformyl)-9-oxabicyclo(3.3.1)nonane in 50 ml. of ethylene dichloride. The reaction mixture is stirred for 5 minutes, after which time it is poured into hot water to precipitate the polymer. The ethylene dichloride is vaporized and the precipitated polymer is collected, washed thrice with water and thrice with methanol, and is dried overnight in vacuo at 70° C. to yield 4.8 g. of polymer having a polymer melt temperature of 396° C.; $\eta_{inh}$=1.66 (m-cresol). A sample of this polyurethane, having an inherent viscosity of 2.2, is dry spun from a 22% solution in a mixture of 1,1,2-trichloroethane/formic acid (65/35 by volume) to produce filaments which, after being drawn 3.5× at 240° C., exhibit T/E/Mi values of 4.1/20/40 when measured at 21° C. and 65% relative humidity.

*Example XIII*

This example illustrates the preparation of a polyurethane from 2,6-bis(chloroformyl)-9-oxabicyclo(3.3.1) nonane and bis(4-aminocyclohexyl)methane (53% t,t-isomer).

Repetition of the procedure of Example XII, but with the bis(4-aminocyclohexyl)methane used being the solid isomeric mixture containing the 53% t,t-isomer, gives 4.8 g. of a polyurethane having a polymer melt temperature of 302° C.; $\eta_{inh}$ is 1.50 (m-cresol). Filaments produced from a sample of this polyurethane, having an inherent viscosity of 2.0 (m-cresol), by a procedure similar to that of Example XII exhibit T/E/Mi values of 3.0/20/40 when drawn as in Example XII.

*Example XIV*

This example illustrates the preparation of, and spinning of a filament from, a polyurethane from 2,6-bis (chloroformyl)-9-oxabicyclo(3.3.1)nonane and piperazine.

(a) Repetition of the general procedure of Example XII, but employing piperazine as the diamine species, affords 3.6 g. of a polyurethane having a polymer melt temperature of 385° C.; $\eta_{inh}$ is 2.25 (m-cresol).

(b) A sample of the polyurethane prepared by the method of (a), above, and having an inherent viscosity of 2.5, is dry spun into filaments, by a procedure similar to that of Example XII(a), from a spinning solution containing 18% solids.

*Example XV*

This example illustrates the preparation of a polyurethane from 2,6-dihydroxy-9-oxabicyclo(3.3.1)nonane and bis(4-isocyanatophenyl)methane by a solution polymerization technique.

A solution comprising 2.37 g. (0.015 mole) of 2,6-dihydroxy-9-oxabicyclo(3.3.1)nonane, 3.75 g. (0.015 mole) of bis(4-isocyanatophenyl)methane, and 20 ml. of anhydrous dimethyl sulfoxide is heated at 90° C. for 4 hours. The solution is then poured into water. The precipitated polymer is isolated, washed thrice with water, and dried overnight in vacuo at 70° C. to yield 5.9 g. of polymer having a polymer melt temperature of 290° C.; $\eta_{inh}$ in 0.7 (dimethyl sulfoxide).

*Example XVI*

This example illustrates the preparation of poly(estercarbonates) from 2,6-bis(carboxyphenoxy)-9-oxabicyclo (3.3.1)nonane by a powder polymerization technique.

(a) By use of the catalyst and general procedure of Example IX, a poly(estercarbonate) is prepared from 2,6-bis(carboxyphenoxy)-9-oxabicyclo(3.3.1)nonane and bis (beta-hydroxyethyl)terephthalate. A poly(estercarbonate) prepared thusly, having a polymer melt temperature of 180° C. and an $\eta_{inh}$ value of 0.63, is melt pressed by conventional methods into a tough, oxidation-resistant film.

(b) By use of the catalyst and general procedure of Example IX, a poly(estercarbonate) is prepared from 2,6-bis(carboxyphenoxy)-9-oxabicyclo(3.3.1)nonane and 1,4-bis(beta-hydroxyethyl)durene dicarboxylate. A poly(estercarbonate) prepared thusly, having a polymer melt temperature of 295° C. and an $\eta_{inh}$ value of 0.53, is melt pressed by conventional methods into a tough, oxidation-resistant film.

*Example XVII*

This example illustrates properties of polyesters prepared by melt polymerization in accordance with this invention. These polyesters consist of a recurring structural unit previously mentioned and appearing hereinafter:

(a)

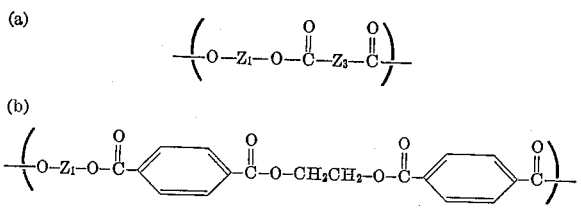

(b)

$$-\left(O-Z_1-O-\overset{O}{\underset{\|}{C}}-\underset{}{\bigcirc}-\overset{O}{\underset{\|}{C}}-O-CH_2CH_2-O-\overset{O}{\underset{\|}{C}}-\underset{}{\bigcirc}-\overset{O}{\underset{\|}{C}}\right)-$$

wherein $Z_1$ and $Z_3$ have the same significance as previously indicated.

In Table 1, the "Type of Polymer Unit" refers to formulae, (a) and (b), hereinbefore mentioned. The column entitled "Coreactant" describes the species which is melt polymerized with 2,6-dihydroxy-9-oxabicyclo (3.3.1)nonane in about equimolar amounts to form the appropriate polyester. "PMT" refers to the polymer melt temperature. Films were melt pressed from each of these polyesters.

TABLE I

| Coreactant | Type of Polymer Unit | PMT (° C.) | $\eta_{inh}$ |
|---|---|---|---|
| Dimethyl terephthalate | (a) | 290 | 0.30 |
| Diphenyl terephthalate | (a) | 290 | 0.35 |
| Dimethyl isophthalate | (a) | 290 | 0.30 |
| Dimethyl isophthalate/Dimethyl terephthalate (90/10) | (a) | 274 | 0.35 |
| Bis(beta-hydroxyethyl)terephthalate | (b) | 274 | 0.48 |

*Example XVIII*

This example demonstrates physical and electrical properties of films prepared from polycarbonates synthesized according to the procedures of Examples VII and VIII. In Table II below, the column "Example" identifies the example whose procedure was used to prepare the respective polymers. The data was obtained at 23° C. and 50% relative humidity.

TABLE II

| Property | EXAMPLE | |
|---|---|---|
| | VII | VIII |
| Film Thickness inches ×10⁻³ | 1.5 | 2.0 |
| Tenacity (K$_{p.s.i.}$), MD | 10.8 | 9.8 |
| Modulus (K$_{p.s.i.}$), MD | 280 | 290 |
| Tear Strength in g. MD | 6.5 | 6.0 |
| Electrical Insulation Resistance (ohm.-cm.) | 8.3×10¹⁷ | 1.45×10¹⁷ |
| Dielectric Constant (10³ cycles) | 3.14 | 5.32 |
| Dissipation Factor | 1.8×10⁻³ | 5.03×10⁻³ |

Shaped articles prepared from the polymers of this invention possess surprising stability to oxidative attack, films and fibers remaining stable even after prolonged exposure (greater than 100 hours) in an air-circulating oven maintained at 100° C. Similarly, they are resistant to degradation by exposure to light, even after being exposed for longer than 150 hours to the light from a xenon arc placed in a model FDA-R Fade-Ometer, manufactured by Atlas Electric Devices Co., Inc., Chicago, Ill. Fibers prepared from the polymers of this invention are resistant to attack by commercial dry cleaning agents and retain their properties after exposure to boiling solutions of dilute alkali. They also exhibit good recovery properties, which are desirable for filaments used in preparing wash-wear fabrics. Films prepared in conventional ways are useful as wrapping or packaging materials, containers, covers, closures, tapes of various types such as insulating tapes and pipe coverings.

Since many different embodiments of the invention may be made without departing from the spirit and scope thereof, it is to be understood that the invention is not limited by the specific illustrations except to the extent defined in the following claims.

What is claimed is:

1. A polymer selected from the group consisting of (1) a polycarbonate having a recurring structural unit of the formula:

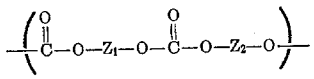

wherein $Z_2$ is a divalent organic radical selected from the group consisting of $Z_1$, p-phenylene, m-phenylene, isopropylidene, di-p-phenylene and sulfonyl di-p-phenylene; (2) a polyurethane having a recurring structural unit of the formula:

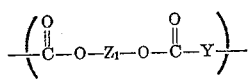

wherein Y is a divalent organic radical selected from the group consisting of 1,4-piperazinylene, methylenebis(1,4-cyclohexyleneimino) and methylenebis(1,4 - phenyleneimino); (3) a polyestercarbonate having a recurring structural unit of the formula:

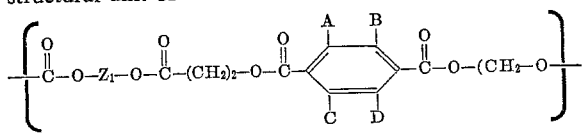

wherein A, B, C, and D are members selected from the group consisting of hydrogen and lower monovalent alkyl radicals and (4) a polyester having a recurring structural unit selected from the group consisting of (a)

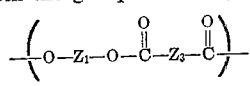

and (b)

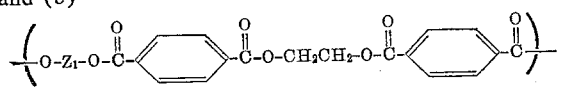

wherein $Z_3$ is a divalent organic radical selected from the group consisting of p-phenylene, m-phenylene and mixtures thereof containing up to about 90% by weight p-phenylene; $Z_1$ being

said $Z_1$, when in the monomeric form, 2,6-dihydroxy-9-oxabicyclo(3.3.1) nonane, having a melting point from about 115° C. to about 129° C.

2. A polycarbonate having a recurring structural unit of the formula:

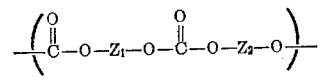

wherein $Z_1$ is

and $Z_2$ is a divalent organic radical selected from the group consisting of $Z_1$, p-phenylene, m-phenylene, isopropylidene, di-p-phenylene, and sulfonyl di-p-phenylene, said $Z_1$, when in the monomeric form, 2,6-dihydroxy-9-oxabicyclo(3.3.1)nonane, having a melting point from about 115° C. to about 129° C.

3. The polycarbonate of claim 2 wherein $Z_2$ is p-phenylene.

4. A polyurethane having a recurring structural unit of the formula:

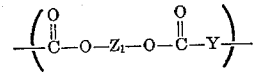

wherein $Z_1$ is

and Y is a divalent organic radical selected from the group consisting of 1,4-piperazinylene, methylenebis(1,4-cyclohexyleneimino) and methylenebis(1,4 - phenyleneimino), said $Z_1$, when in the monomeric form, 2,6-dihydroxy-9-oxabicyclo(3.3.1)nonane, having a melting point from about 115° C. to about 129° C.

5. The polyurethane of claim 4 wherein Y is methylenebis(1,4-cyclohexyleneimino).

6. A polyestercarbonate having a recurring structural unit of the formula:

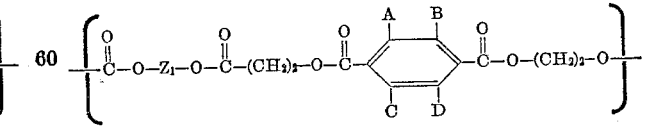

wherein $Z_1$ is

and A, B, C and D are members selected from the group consisting of hydrogen and lower monovalent alkyl radicals, said $Z_1$ when in the monomeric form, 2,6-dihydroxy-9-oxabicyclo(3.3.1)nonane, having a melting point from about 115° C. to about 129° C.

7. A polyester having a recurring structural unit selected from the group consisting of (a)

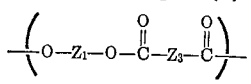

and (b)

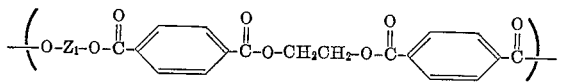

wherein $Z_1$ is

and $Z_3$ is a divalent organic radical selected from the group consisting of p-phenylene, m-phenylene and mixtures thereof containing up to about 90% by weight of p-phenylene, said $Z_1$ when in the monomeric form, 2,6-dihydroxy-9-oxabicyclo(3.3.1)nonane, having a melting point from about 115° C. to about 129° C.

References Cited

UNITED STATES PATENTS

| | | | |
|---|---|---|---|
| 2,997,459 | 8/1961 | Schnell et al. | 260—47 |
| 3,118,861 | 1/1964 | Wiener | 260—75 |
| 3,136,741 | 6/1964 | Schnell et al. | 260—47 |
| 3,161,615 | 12/1964 | Goldberg | 260—47 |
| 3,164,569 | 1/1965 | Ide et al. | 260—75 |
| 3,288,812 | 11/1966 | Lafont et al. | 260—345.9 |

FOREIGN PATENTS

| | | |
|---|---|---|
| 634,659 | 1/1964 | Belgium. |
| 1,336,187 | 7/1963 | France. |

SAMUEL H. BLECH, *Primary Examiner.*